US009232430B2

(12) United States Patent
Sågfors et al.

(10) Patent No.: US 9,232,430 B2
(45) Date of Patent: Jan. 5, 2016

(54) CONGESTION CONTROL WITHIN A RADIO ACCESS NETWORK

(71) Applicant: TELEFONAKTIEBOLAGET L M ERICSSON (PUBL), Stockholm (SE)

(72) Inventors: Mats Sågfors, Kyrkslått (FI); Paul Teder, Täby (SE); Tarmo Kuningas, Sollentuna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 14/677,107

(22) Filed: Apr. 2, 2015

(65) Prior Publication Data
US 2015/0215807 A1 Jul. 30, 2015

Related U.S. Application Data

(63) Continuation of application No. 11/664,090, filed as application No. PCT/EP2004/052846 on Oct. 8, 2004, now abandoned.

(51) Int. Cl.
| | |
|---|---|
| *H04W 28/02* | (2009.01) |
| *H04W 72/04* | (2009.01) |
| *H04W 84/12* | (2009.01) |
| H04W 88/12 | (2009.01) |

(52) U.S. Cl.
CPC ...... *H04W 28/0215* (2013.01); *H04W 28/0236* (2013.01); *H04W 72/0486* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 7,292,825 B2 | 11/2007 | Beale et al. | |
| 2001/0036168 A1 | 11/2001 | Terry | |
| 2002/0080749 A1 | 6/2002 | Terry | |
| 2003/0147362 A1 | 8/2003 | Dick et al. | |
| 2003/0156580 A1 | 8/2003 | Abraham et al. | |
| 2003/0219005 A1 | 11/2003 | Isnard et al. | |
| 2003/0223454 A1 | 12/2003 | Abraham et al. | |
| 2004/0106405 A1* | 6/2004 | Gabriel et al. | 455/435.1 |

(Continued)

FOREIGN PATENT DOCUMENTS

| | | |
|---|---|---|
| JP | 2002-118598 A | 4/2002 |
| WO | WO 00/60790 A2 | 10/2000 |

(Continued)

OTHER PUBLICATIONS

Abraham, et al. "Effect of Timing Adjust Algorithms on Iub Link Capacity for Voice Traffic in W-CDMA Systems", Vehicular Technology Conference, 2002, IEEE 56th, vol. 1, pp. 311-315.

(Continued)

*Primary Examiner* — Chirag Shah
*Assistant Examiner* — Suk Jin Kang

(57) ABSTRACT

A method of controlling the volume of user-plane traffic on the Iub or Iub/Iur interface between a Radio Network Controller and a Node B of a UMTS Radio Access Network during periods of overload. The method comprises, for individual uplink or downlink connections established over the Iub or Iub/Iur interface, monitoring at the Radio Network Controller the late arrival of frames at the Radio Network Controller or at the Node B transmitted over the Iub or Iub/Iur interface, and based on the results of said monitoring, causing a reduction in the Iub or Iub/Iur load for a connection when appropriate.

16 Claims, 3 Drawing Sheets

(56) References Cited

U.S. PATENT DOCUMENTS

| | | | |
|---|---|---|---|
| 2004/0120306 | A1 | 6/2004 | Wigard et al. |
| 2004/0213199 | A1* | 10/2004 | Cheng .......................... 370/350 |
| 2004/0219919 | A1* | 11/2004 | Whinnett et al. ............. 455/442 |
| 2004/0252699 | A1 | 12/2004 | Drevon et al. |
| 2005/0025194 | A1 | 2/2005 | Adjakple et al. |
| 2007/0053339 | A1 | 3/2007 | Peisa et al. |
| 2007/0133605 | A1 | 6/2007 | Herrmann |
| 2008/0084822 | A1* | 4/2008 | Sagfors et al. ................ 370/235 |
| 2010/0120444 | A1* | 5/2010 | Kuningas et al. ............. 455/450 |
| 2012/0220305 | A1* | 8/2012 | Kuningas et al. ............. 455/450 |

FOREIGN PATENT DOCUMENTS

| | | | |
|---|---|---|---|
| WO | WO 02/093946 | A2 | 11/2002 |
| WO | WO 03/075486 | A1 | 9/2003 |
| WO | WO 2004/057810 | A2 | 7/2004 |

OTHER PUBLICATIONS

Saraydar et al.; Impact of Rate Control on the Capacity of an Iub Link: Multiple Service Case; IEEE 2003; Wireless Communications and Networking, vol. 2, Mar. 20, 2003, pp. 1418-1423.

Tanenbaum, 5.3. I General Principles of Congestion Control, Third Edition- Computer Networks, Prentice-Hall of India, Sep. 2001, pp. 376-377.

Tanenbaum, 6.4.6 TCP Congestion Control, Third Edition- Computer Networks, Prentice-Hall of India, Sep. 2001, pp. 536-539.

European office action, Sep. 16, 2008, in corresponding EP Application No. 04 791 186.2.

International Search Report mailed Jun. 28, 2005.

Written Opinion of the International Searching Authority.

International Preliminary Report on Patentability.

Notification of the Recording of a Change.

3GPP: "3GPP TS 25.402 v5.3.0 3ra Generation Partnership Project; Technical Specification Group Radio Access Network; Synchronisation in UTRAN Stage 2 (Release 5)" 'Online! pp. 1-47, XP002331313 Dec. 2003.

3GPP: "3GPP TS 25.321 v6.2.0 3ro Generation Partnership Project; Technical Specification Group Radio Access Network; Medium Access Control (MAC) protocol specification (Release 6)" 'Online! pp. 1-61, XP002331314 Jun. 2004.

3GPP: "3GPP TS 25.322 v6.1.0 3ra Generation Partnership Project; Technical Specification Group Radio Access Network; Radio Link Control (RLC) protocol specification (Release 6)" 'Online! pp. 1-78, XP002331315 Jun. 2004.

* cited by examiner

CONGESTION CONTROL WITHIN A RADIO ACCESS NETWORK

RELATED APPLICATIONS

This application is a continuation of co-pending U.S. patent application Ser. No. 11/664,090 filed Mar. 29, 2007, which was the National Stage of International Application No. PCT/EP2004/052846, filed Oct. 8, 2004, the disclosures of which are incorporated herein by reference in their entireties.

FIELD OF THE INVENTION

The present invention relates to a mechanism for congestion control within a radio access network of a telecommunications system. More particularly, the invention relates to a congestion control mechanism for the Iub or Iub/Iur interface of a UMTS Radio Access Network.

BACKGROUND TO THE INVENTION

The Third Generation Partnership Project group, known as 3GPP, is involved in ongoing standardisation work on the WCDMA group of protocols referred to as Universal Mobile Telecommunications System (UMTS) or 3G. A UMTS operator network can be separated into a number of major components, namely one or more core networks which are responsible for setting up and controlling user sessions, and a UMTS Radio Access Network (UTRAN) which controls access to the air interface. The architecture of a UTRAN is illustrated schematically in FIG. 1. The interface between the UTRAN and the user equipment (UE) is provided by nodes referred to as "NodeBs" (analogous to Base Stations in 2G/GSM networks). The NodeBs are responsible for transmitting and receiving data over the air interface and are controlled by Radio Network Controllers (RNCs). User and control data is routed between UEs and a core network via the NodeBs and the RNCs. The interface between a NodeB and an RNC is referred to as the Iub interface.

There are situations in which the same data may be transmitted between a given UE and an RNC via two or more NodeBs. This is referred to as Diversity Handover Function (DHO) or macro-diversity. The NodeBs may be controlled by the same or different RNCs. In the latter case, data is routed to the controlling (or serving) RNC via a drift RNC. The interface between the serving and the drift RNC is referred to as the Iur interface. Both scenarios are illustrated in FIG. 1.

The protocols responsible for carrying the payload between an RNC and a NodeB are described in 3GPP TS 25.435 and TS 25.427 for common (i.e. shared) and dedicated channels respectively. The protocol layers present at the RNC and NodeB are shown in FIG. 2. Of particular relevance here are the Frame Protocols (denoted FP in FIG. 2), which are responsible for carrying the user-plane data offered by upper layers (MAC/RLC) between the NodeB and the RNC.

The transport network (TN) underneath the Frame Protocol can be realized either as a cell-switched ATM network, or as a packet-based IP network. The typical approach to ensure that the transport network delivers the required service quality is to apply some kind of transport network admission control mechanism, which allows new connections as long as there is capacity available. This strategy works well for connections whose offered load and statistical properties are well known and understood, e.g. voice. The aggregated load of such connections can be easily and accurately estimated. If the estimated load exceeds the capacity of the transport network, no further connections are admitted. Thus, it can be ensured that all active connections receive the expected transport network service quality without wasting resources with an overly conservative admission mechanism.

Transport network reservation and admission control is much more difficult when packet switched (PS) data connections are considered, for a number of reasons:
  The load presented by a PS channels can be much higher than for a voice connection: up to 384 kbps and more over a Dedicated Channel (DCH), and on the order of Mbps over a High Speed Downlink Shared Channel (HS-DSCH).
  The traffic pattern over PS bearers shows a much higher degree of variation than for voice connections, having long idle periods followed by large data bursts.
  The statistical properties of PS traffic are neither very well understood nor captured by any simple models. The load can be a complex function of link quality, pricing, customer segment, time of day/year, etc.

When a transport network admission procedure is used for PS traffic, two different approaches may be adopted:
  Prudent Admission:
  To make sure that the transport network always delivers the desired performance, incoming connections are blocked at moderate reservation levels. The drawback is the likelihood of the unnecessary blocking of incoming connections at times when the admitted connections exhibit low activity. This solution leads to low utilization of transport network resources and blocked connections.
  Generous Admission:
  To avoid unnecessary blocking, more PS users are admitted than could momentarily be served if all connections turned active (the assumption being that not all users will simultaneously choose to send or receive data). The drawback is the increased likelihood of transport network overload at times when too many connections offer load.

Typically, the first of these approaches is used, meaning that only a few PS connections of, say 384 kbps, can be admitted at any given time. This is particularly true if the Iub is realized with thin E1 or T1 links.

It would be desirable to admit more PS connections (to avoid blocking) and have some method to handle the potential Iub overload conditions. There are two problems in implementing such a solutions. Firstly, there is no mechanism for explicitly detecting congestion on the Iub interface on a per connection basis. Secondly, the involved Iub protocols are unresponsive to Iub congestion. This means that the FP entity will always supply the transport network with the load offered by the MAC/RLC entities, irrespective of the potential overload over the Iub interface. Existing art on Iub load control (e.g. Saraydar et. al: "Impact of rate control on the capacity of an Iub link: Multiple service case, *Proceedings WCNC* 2003) employs centralised solutions based on some congestion control algorithm. EP1331768 and US2003223454 also propose centralised solutions to the problem of Iub load control.

The problem can be further illustrated by assuming a generous admission strategy where several 384 kbps bearers have been admitted over a thin Iub realization. When several/all bearers happen to offer traffic simultaneously, the result is likely to be delayed or lost Iub frames for some or all of the connections. Since the PS bearers are typically realised with Acknowledged Mode (AM), the receiving RLC entities will request re-transmissions of the lost frame content. This means that the overload may persist, as the FP instances will continue to shuffle data over the Iub so long as the sending MAC/RLC offers it. In a worst case scenario, no connection receives any data on time and all lost data goes to the sending RLC re-transmission buffers. The RLC/MAC/FP entities will then keep offering overload data to the Iub without any relief until protocol errors occur and the re-transmissions are abandoned with resets.

SUMMARY OF THE INVENTION

A solution to the overload problem described above is to create a method to gracefully reduce the Iub load at times of overload. A mechanism is proposed which seeks to alleviate Iub congestion using a decentralized approach based on local measurements received from the Iub interface. Various means are considered to control the congestion using both existing and new methods to respond to the detected Iub congestion. This applies equally to scenarios where the overload occurs over the combined Iub/Iur interface.

The first symptom of Iub (or Iub/Iur) overload is the delay in frame arrival at the receiving FP entity. For the downlink direction (i.e. RNC to NodeB), the FP defines a window-based mechanism by which the frame arrival is monitored. This mechanism is illustrated in FIG. 2 and is needed to ensure that frames can be transmitted on time over the air (to support macro-diversity). In case a frame is received in the "Late" or "Too Late" region, the NodeB responds by sending a Timing Adjust (TA) frame to the RNC, indicating that the frame was (almost) too late for sending over the air. The primary purpose of this TA frame is to supervise timing offset control in the RNC, since different Iub legs of the macro-diversity scheme may have different delays. In the uplink direction (i.e. NodeB to RNC), a similar window-based mechanism can be implemented, with the RNC having direct access to the timing data (i.e. in the uplink direction there is no need for the sending of TA frames).

It is an object of the present invention to utilise the window-based mechanisms for detecting late arrival of frames over the Iub interface, to provide an early indication of Iub congestion. This approach is applicable to both the uplink and downlink directions, and allows congestion to be detected on a per connection basis. This is in contrast to the known centralised approaches, which provide only centralised solutions for congestion control of the Iub interface.

According to a first aspect of the present invention there is provided a method of controlling the volume of user-plane traffic on the Iub or Iub/Iur interface between a Radio Network Controller and a Node B of a UMTS Radio Access Network during periods of overload, the method comprising, for individual uplink or downlink connections established over the Iub or Iub/Iur interface, monitoring at the Radio Network Controller the late arrival of frames at the Radio Network Controller or at the Node B transmitted over the Iub interface, and based on the results of said monitoring causing a reduction in the Iub load for a connection when appropriate.

The invention is applicable in particular to packet switched (PS) connections established over the Iub interface. Embodiments of the invention reduce the likelihood of connection blocking, since it is possible to allow for more PS bearers over Iub at any given time. The increased probability of Iub congestion is then handled in such a way as to gracefully decrease the load at times of congestion. The benefits include:

Higher Iub resource utilisation—lower network deployment costs,

Lower probability of connection blocking—higher customer satisfaction,

Graceful congestion handling with minor impact on user perception—higher customer satisfaction.

Furthermore, the method proposed here employs decentralized load control, where the load-control of a connection is independent of any other connection utilising the Iub link. This makes the proposed mechanism much simpler and easier to deploy.

The method proposed here uses Iub congestion measurements, as opposed to the prior art which generally relies on a method where the aggregated load is calculated by adding the load of every connection of each particular Iub link. Again, this makes the proposed method simpler and more straightforward to implement.

The control method of the present invention may be applied to all connections over the Iub interface, or only to a subset of those connections. For example, the method may be applied only for those connections transporting packet switched data.

The invention is also applicable to connections over the Iub interface established to transport circuit switched data such as speech. Iub load reduction may be achieved by reducing the codec rate for the speech data.

In certain embodiments of the invention, the step of monitoring the late arrival of frames comprises analysing results provided by a Frame Protocol entity. In the case of the downlink direction, these results are derived from TA-frames received at the radio network controller from the NodeB. In the uplink direction, the results are derived directly based upon the time of arrival of frames at the radio network controller.

Said step of monitoring the late arrival of frames may comprise counting the number of TA-frames for the downlink direction, and/or late arriving frames in the uplink direction, and comparing the count value to some threshold value, Iub load reduction being triggered when the count is equal to or exceeds the threshold value. Alternatively, load reduction may be triggered based upon some defined probability following receipt of a TA-frame or the late arrival of a frame.

Said step of monitoring the late arrival of frames may comprise observing the time of arrival values contained in received TA-frames, or calculated for late arriving frames, and triggering Iub load reduction if the time of arrival exceeds some defined threshold value.

Said step of causing a reduction in the Iub load may comprise one or more of:

Restricting the allowed transport formats available to the MAC entity.

Reducing the size of the RLC window.

Switching the Radio Access Bearer (RAB) to a state with a lower Iub resource consumption.

Dropping IP packets queued for transmission over the congested Iub link.

Discarding a fraction of the Iub user-plane frames in response to a TA frame received at the radio network controller from a NodeB.

Alternatively or in addition the step of causing a reduction in the Iub or Iub/Iur load comprises requesting a reduction of the coding rate of a multi-rate speech encoder/decoder pair.

According to a second aspect of the present invention there is provided a method of controlling the volume of user-plane traffic on the Iub or Iub/Iur interface between a Radio Network Controller and a Node B of a UMTS Radio Access Network during periods of overload, the method comprising, for individual uplink or downlink connections established over the Iub or Iub/Iur interface, monitoring at the Radio Network Controller or User Equipment the RLC retransmission rate or RLC throughput, and based on the results of said monitoring causing a reduction in the Iub load for a connection when appropriate.

According to a third aspect of the present invention there is provided a method of controlling the volume of user-plane traffic on the Iub interface between a Radio Network Controller and a Node B of a UMTS Radio Access Network during periods of overload, the method comprising, for individual downlink connections established over the Iub or Iub/Iur interface, monitoring at the Node B the late arrival of frames at the Node B transmitted over the Iub interface, and based on the results of said monitoring causing a reduction in the Iub load for a connection when appropriate.

In an embodiment of this aspect of the invention, said step of monitoring may comprise comparing time stamps contained within received frames with a local clock.

According to a fourth aspect of the present invention there is provided a method of controlling the volume of user-plane traffic on the Iub or Iub/Iur interface between a Radio Network Controller and a Node B of a UMTS Radio Access Network during periods of overload, the method comprising, for individual uplink or downlink connections established over the Iub or Iub/Iur interface, monitoring the late arrival of frames at the Radio Network Controller or at the Node B transmitted over the Iub or Iub/Iur interface, and based on the results of said monitoring, causing a reduction in the Iub or Iub/Iur load by restricting the allowed transport formats available to the sending Medium Access Control entity on a per connection basis.

DETAILED DESCRIPTION OF CERTAIN EMBODIMENTS OF THE PRESENT INVENTION

Figure 1:
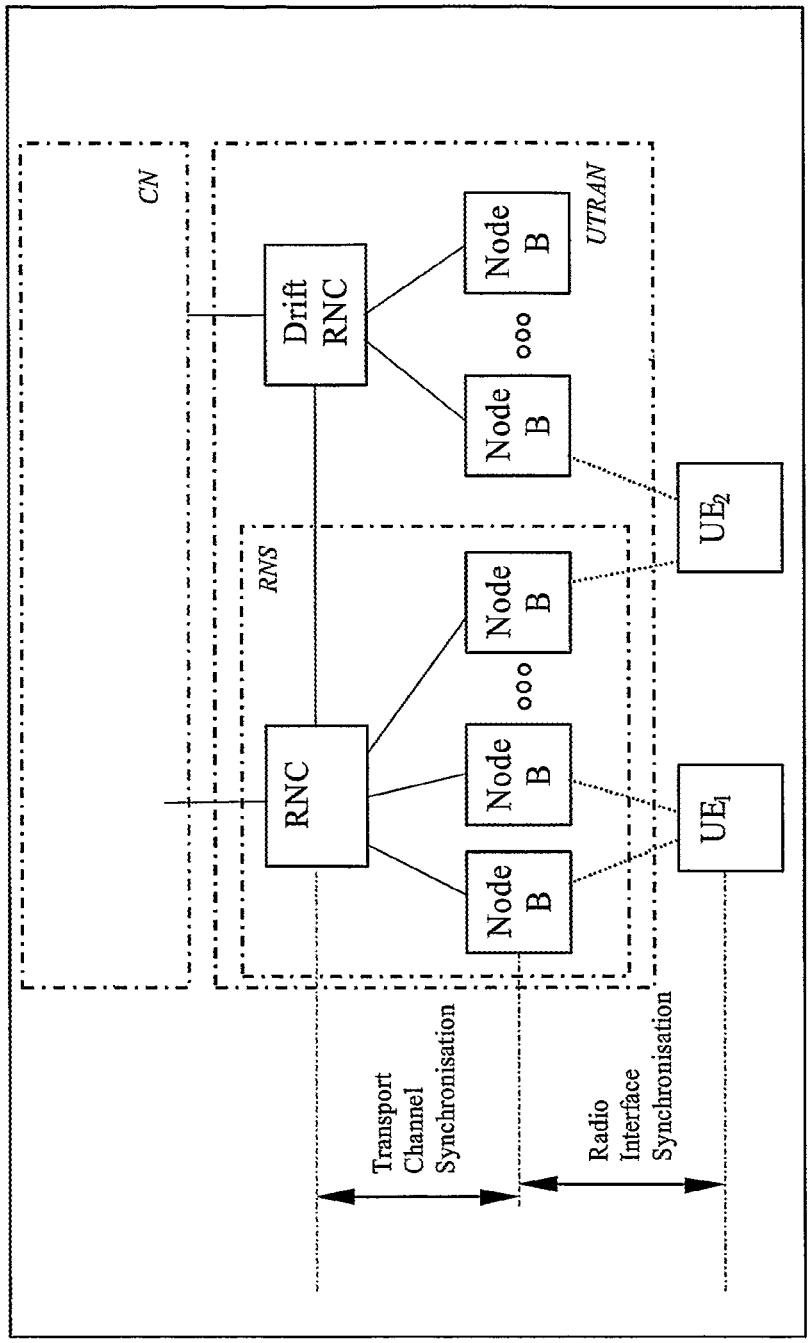
FIG. 1 illustrates schematically the UTRAN architecture of a UMTS system.
Figure 2:
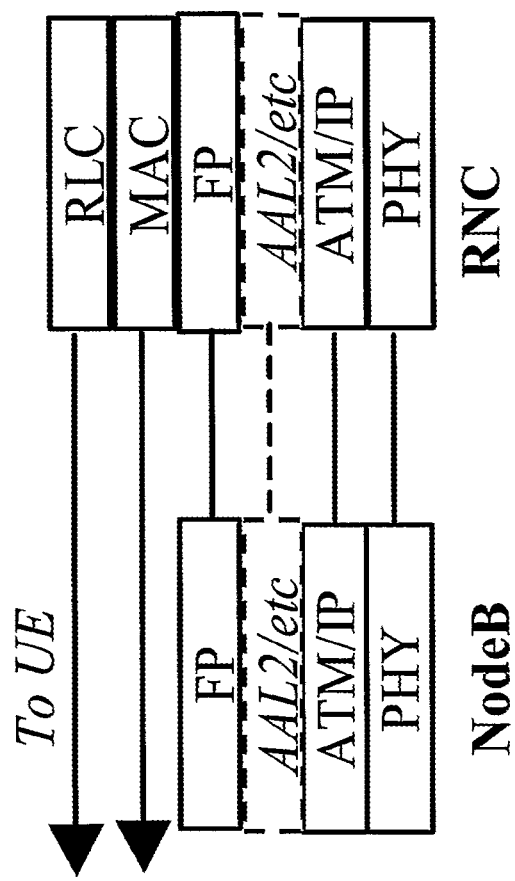
FIG. 2 shows elements of the protocol stack present at the RNC and at the NodeB of the UTRAN of FIG. 1.
Figure 3:
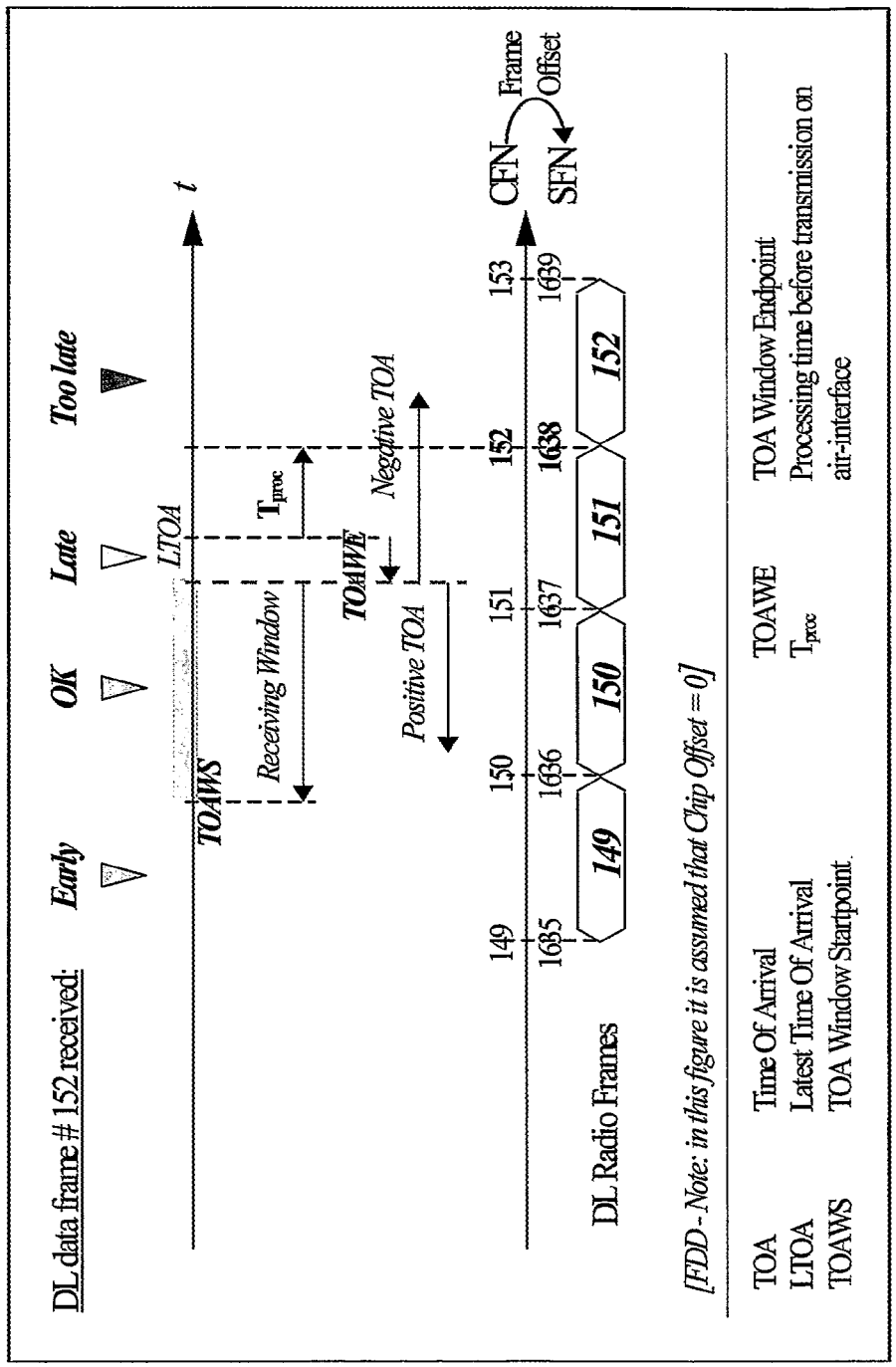
FIG. 3 illustrates schematically a frame synchronisation window concept implemented at a NodeB of the UTRAN of FIG. 1.

The Frame Protocol (FP) between an RNC and a NodeB and its position within the protocol stack is illustrated schematically in FIG. 2. One job of the FP is the implementation of a Frame Synchronization function which takes care of the timing of frames over the Iub interface between an RNC and the associated NodeB (or NodeB's in the macro-diversity scenario). FIG. 3 illustrates the frame synchronisation window at a NodeB in relation to the downlink (DL) radio frame structure, where the time taken to process a frame at the NodeB is defined as Tproc. In the uplink direction, the serving RNC may coordinate the receipt of identical frames received over the different Iub's/Iur's, and again the Frame Synchronization function should ensure that frames are received at the serving RNC on time.

Considering further the downlink direction, a certain frame with an associated CFN number must be transmitted over the air at a given time. If there are several NodeBs and Iub/Iur links involved, all NodeBs have to transmit that particular frame at the same time. Assuming that the delays over the Iub links differ, the serving RNC must send the frame with a sufficient time-offset, so that the frames are received at all transmitting NodeBs on time. Those NodeBs "behind" a fast Iub link must buffer the frames until the scheduled time for transmission.

To supervise this function, 3GPP TS 25.402 specifies parameters defining a "Receiving Window", which facilitates monitoring of whether frames are received early or late at a NodeB. These parameters are illustrated in FIG. 3. The window serves as a 'target' so that ToAWS (Time of Arrival Window Start point) defines the earliest point and the minimum buffering capability needed by the NodeB, while the ToAWE (Time of Arrival Window End point) defines the latest 'desired' arrival time of a frame. Frames received during the period between ToAWE and a LtoA (Latest Time of Arrival) point are considered late, but not too late for transmission. Frames received after LtoA are discarded. The standard specifies how the NodeB shall report to the RNC in case the frames are received outside the widow, so that the RNC can adapt its offset accordingly: for each frame received outside the Receiving Window, the NodeB shall respond with a "Timing Adjustment" (TA) frame, indicating the ToA (Time of Arrival) of the frame, so that the serving RNC can adjust its offsets.

It is proposed here to use the TA-frame mechanism as an indication of congestion in the downlink direction, and to take appropriate actions at the RNC to alleviate the congestion. Of course this does not affect the option to also use the TA frame for its intended purpose, i.e. frame synchronisation. In the uplink direction, the RNC has direct access to the timing data produced by the FP entity at the RNC.

Since the FP does not support any methods for load control, load reduction can be achieved at the RNC using methods available at the Medium Access Control (MAC), Radio Link Control (RLC), or Radio Resource Control (RRC) levels. These methods include temporarily:

a) Restricting the allowed transport formats available to the MAC entity. For a 384 kbps connection, this means that the connection capacity may drop for example to 128 kbps for a limited period of time (by reducing the maximum number of transport blocks from 12 to 4 per Transmission Time Interval, assuming that the transport block contains 40 octets of payload and the transmission time interval is equal to 10 ms). This is perhaps the preferred approach.

b) Reducing the size of the RLC window. Since the RLC window limits the maximum amount of outstanding data, this will reduce the overload. For example, the RLC window could be constrained to the level currently in use, meaning that only re-transmissions are allowed until further data is acknowledged from the receiving entity.

c) Switching the Radio Access Bearer (RAB) to a state with a lower Iub resource consumption. This involves RRC signalling between the RNC and the User Equipment (UE).

d) Dropping IP packets (RLC SDUs) queued for transmission over the congested Iub link.

e) Discarding a fraction, e.g. ½ or ⅓, of the Iub user-plane frames in response to a TA frame received at the RNC from a NodeB ("selective frame discard").

All of these actions will reduce the load produced by a connection over the congested Iub link and are applicable both in downlink and in uplink.

The intelligence which acts upon congestion detection to implement load reduction is located within the RNC. This intelligence is a "tool" available in the MAC, RLC, and/or RRC to control the Iub/Iur overload. It is essentially a Transport Resource Management entity within the RNC.

The trigger level at which overload reduction is precipitated is a design feature which will depend to some extent on expected network behaviour as well as network capabilities. However, by way of example, one may specify a number of TA-frames which triggers overload reduction. Another solution is to implement overload reduction upon receipt of a TA-frame, based on some probability, e.g. 50%, i.e. for each TA-frame received, there is a 50% chance of overload reduction being precipitated. Both these solutions address two problems. Firstly, they avoid synchronised back-off of all connections at the same time and, secondly, they avoid reducing the bit-rate when the cause of the TA-frame is a static delay. The second problem could also be addressed by not reacting in case that a TA-frame arrives for a "new" leg in soft handover, because then it is likely that the frame was due to a static delay for the new leg. This filtering of TA-frames may be used in conjunction with one of the other proposed solutions.

Overload control procedures a) and b) outlined above are established protocol procedures specified in 3GPP TS25.321 and TS25.322, respectively. Both will result in a decreased load, without generating additional losses. The actions are very fast in the downlink, and can be assigned on a TTI basis. For uplink load control, there is a somewhat higher delay due to the fact that the TFCS limitation (or RLC window size restriction) has to be signalled over the air from the RNC to the UE.

Procedure c) involves standard RRC procedures, but the delay (as compared to procedures a) and b)) is higher. A benefit of procedure c) is the fact that the radio-resources are also relieved during a period of lower bearer utilisation. For example, switching to a lower bearer rate releases spreading code resources for the WCDMA downlink. It is more efficient to send 60 kbps over a 64 kbps link, than to send the same 60 kbps over a 384 kpbs. This is because the "per-bit" resource consumption over 384 kbps is higher compared to 64 kpbs: both code and code-power is cheaper over a thinner downlink.

As well as reducing the momentary load, procedure d) has the advantage that it will also reduce the more persistent end-to-end load through the reactivity of end-to-end protocols like TCP ("Active Queue Management", AQM), given that the RLC SDUs are discarded outside the RLC AM loop and the losses will be visible to end-to-end protocols like TCP. TCP is reactive to packet losses and will therefore reduce its load resulting in a lower load offered to the Iub link.

Procedure e) has the benefit that it affects only the Iub leg that is subject to the congestion. If the UE is in soft-handover and it can identify the content of the frame based on receptions from other legs (without from the congested Iub leg), it means that the RLC/MAC throughput will remain unaffected. If the UE does not receive the content of the discarded frame(s), the content will be requested for retransmission by RLC.

Procedure e) is currently applicable in downlink only, as there is currently no means to indicate uplink Iub congestion to the NodeB and such an indication would be required in order to drop packets before the congestion point (although it is possible that some new measurement will be standardised for that purpose, in which case the procedure is equally applicable to the uplink). For the downlink however, the benefits of discarding outgoing Iub user plane frames include:

Avoiding the build-up of a queue (or queues) on the Transport Network Layer (TNL), i.e. ET-boards on transmitting nodes: long queues result in excessive delays and hence the very late arrival of frames at the NodeB, i.e. such very late frames will in any case be discarded by the NodeB.

Avoiding losses on the TNL when the TNL buffers are short: the frames are discarded for one or a few connections in a controlled manner instead of in an uncontrolled way for many/all connections.

The implementation of a load control procedure at the RNC may not immediately remove the overload condition. In that case, if additional indications of congestion are received, the procedure may be repeated. If no further indications of congestion are received during a guard-time since the last indication of congestion for a particular connection, then the originally allocated resources can be reassigned to the connection. In order to avoid all users affected by the congestion procedure re-increasing their load simultaneously, the guard-time can preferably be a timer which is subject to random variations. In addition, or alternatively, it is possible to assign a probability at which each connection reacts to a congestion indication, thereby ensuring that all connections do not react to a congestion situation at the same time (see the above consideration of the overload trigger being defined as a probability following receipt of a TA-frame).

The overload procedures a) to e) may be deployed separately or in combination. As an example of the latter approach, the actions in a) to e) can be deployed in a sequential manner, depending on the persistency of the congestion:

Following a first indication of congestion for a given connection:
    If the connection is in soft-handover and the congested leg is not the "main" leg, then deploy d)
    Otherwise, deploy a) or b)
If the congestion persists, deploy both c) and e)
    Optionally, execute also d) or a)/b) as above, since it takes much longer for c) and e) to take any effect.

As an alternative to using the standardised TA-frame as a congestion indication, one could consider using the present timing offset values, or consider creating and standardising a particular measurement for that purpose. The former case could involve monitoring the offset value and take any of the described actions in a. c to e. in case the offset is observed to be increasing above a certain threshold. The potential invention should also include the possibility to use other measurements as an Iub congestion indication, including:

RLC re-transmission rate (which increases significantly in the event of persistent congestion),
RLC throughput,
Time-stamped frames for jitter and/or delay analysis.

The method can be applied without modifications to existing standards. However, there are issues that could be considered for standardisation.

In order to de-couple offset adjustments and Iub congestion control, there may be a need to define separate measurements for the two.
Iub uplink congestion: To achieve fast load reduction at times of Iub uplink congestion, there could be a need to indicate congestion from the RNC to the NodeB. This is not possible with the current standard. Without this possibility, the Iub congestion has to be alleviated by controlling the Uu load, which involves signalling over the air. If the RNC could request the NodeB to reduce its load, the NodeB could then take quick actions to reduce the amount of frames admitted over Iub minimising the detrimental consequences of the overload.

Although reference is made above to the Iub interface, it will be appreciated that in the case where both a serving and drift RNC are involved in a connection, congestion occurs over the combined Iub/Iur interface, and it will be the serving RNC which receives the TA-frames (or other congestion indication) and precipitates the overload reduction procedure. The drift RNC is effectively transparent to the TA-frames and does not react to overload situations.

It will be appreciated by the person of skill in the art that various modifications may be made to the above described embodiments without departing from the scope of the present invention.

The invention claimed is:

1. A method of controlling the volume of user-plane traffic on the Iub or Iub/Iur interface between a Radio Network Controller and a Node B of a UMTS Radio Access Network during periods of overload, the method comprising:
   for individual uplink or downlink connections established over the Iub or Iub/Iur interface, monitoring at the Radio Network Controller the late arrival of frames carrying user-plane data at the Radio Network Controller or at the Node B transmitted over the Iub or Iub/Iur interface, wherein said monitoring comprises counting the number of Timing Adjust frames for the downlink direction and late arriving frames in the uplink direction, and comparing the count value to some threshold value; and
   based on the results of said monitoring, causing a reduction in the Iub or Iub/Iur load for a connection when the count is equal to or exceeds the threshold value.

2. The method according to claim 1, wherein the method is applied to packet switched connections over the Iub or Iub/Iur interface.

3. The method according to claim 1, the step of monitoring the late arrival of frames comprises analysing results provided by a Frame Protocol entity.

4. The method according to claim 3, wherein for the downlink direction said results are derived from Timing Adjust frames received at the Radio Network Controller from the Node Band, in the uplink direction, wherein the results are derived directly based upon the time of arrival of frames at the Radio Network Controller.

5. The method according to claim 1, Iub or Iub/Iur load reduction being triggered based upon some defined probability following receipt of a Timing Adjust frame or the late arrival of a frame.

6. The method according to claim 1, said step of monitoring the late arrival of frames comprising observing the time of arrival values contained in received Timing Adjust frames, or delays calculated for late arriving frames, and triggering Iub or Iub/Iur load reduction if the time of arrival or delay exceeds some defined threshold value.

7. The method according to claim 1, said step of causing a reduction in the Iub or Iub/Iur load comprising restricting the allowed transport formats available to the sending Medium Access Control entity.

8. The method according to claim 1, said step of causing a reduction in the Iub or Iub/Iur load comprising reducing the size of the Radio Link Control window.

9. The method according to claim 1, said step of causing a reduction in the Iub or Iub/Iur load comprising switching the Radio Access Bearer to a state with a lower Iub resource consumption.

10. The method according to claim 1, said step of causing a reduction in the Iub or Iub/Iur load comprising dropping IP packets queued for transmission over the congested Iub or Iub/Iur link.

11. The method according to claim 1, said step of causing a reduction in the Iub or Iub/Iur load comprising discarding a fraction of the Iub user-plane frames in response to a Timing Adjust frame or frames received at the radio network controller from a Node B.

12. The method according to claim 1, wherein said step of causing a reduction in the Iub or Iub/Iur load comprises requesting a reduction of the coding rate of a multi-rate speech encoder/decoder pair.

13. A method of controlling the volume of user-plane traffic on the Iub or Iub/Iur interface between a Radio Network Controller and a Node B of a UMTS Radio Access Network during periods of overload, the method comprising:
   for individual downlink connections established over the Iub or Iub/Iur interface, monitoring at the Node B the late arrival of frames carrying user-plane data at the Node B transmitted over the Iub or Iub/Iur interface, wherein said monitoring comprises counting the number of Timing Adjust frames for the downlink direction and late arriving frames in the uplink direction, and comparing the count value to some threshold value; and
   based on the results of said monitoring causing a reduction in the Iub or Iub/Iur load for a connection when the count is equal to or exceeds the threshold value.

14. The method according to claim 13, said step of monitoring comprises comparing time stamps contained within received frames with a local clock.

15. A method of controlling the volume of user-plane traffic on the Iub or Iub/Iur interface between a Radio Network Controller and a Node B of a UMTS Radio Access Network during periods of overload, the method comprising:
   for individual uplink or downlink connections established over the Iub or Iub/Iur interface, monitoring the late arrival of frames carrying user-plane data at the Radio Network Controller or at the Node B transmitted over the Iub or Iub/Iur interface, wherein said monitoring comprises counting the number of Timing Adjust frames for the downlink direction and late arriving frames in the uplink direction, and comparing the count value to some threshold value; and
   based on the results of said monitoring, causing a reduction in the Iub or Iub/Iur load when the count is equal to or exceeds the threshold value by restricting the allowed transport formats available to the sending Medium Access Control entity on a per connection basis.

16. A Radio Network Controller node configured to control the volume of user-plane traffic on the Iub or Iub/Iur interface between the Radio Network Controller and a Node B of a UMTS Radio Access Network during periods of overload, the Radio Network Controller comprising:
   monitoring circuitry configured to monitor a late arrival of frames carrying user-plane data at the Radio Network Controller or at the Node B transmitted over the Iub or Iub/Iur interface for individual uplink or downlink connections established over the Iub or Iub/Iur interface, wherein said monitoring comprises counting the number of Timing Adjust frames for the downlink direction and late arriving frames in the uplink direction, and comparing the count value to some threshold value; and
   load control circuitry configured to cause a reduction in the Iub or Iub/Iur load for a connection when the count is equal to or exceeds the threshold value based on monitoring information generated by the monitoring circuitry.

* * * * *

UNITED STATES PATENT AND TRADEMARK OFFICE
CERTIFICATE OF CORRECTION

PATENT NO. : 9,232,430 B2  
APPLICATION NO. : 14/677107  
DATED : January 5, 2016  
INVENTOR(S) : Sågfors et al.

Page 1 of 1

It is certified that error appears in the above-identified patent and that said Letters Patent is hereby corrected as shown below:

Specification

In Column 1, Line 6, delete "of co-pending U.S." and insert -- of U.S. --, therefor.

In Column 1, Line 7, delete "2007," and insert -- 2007, now abandoned, --, therefor.

Signed and Sealed this  
Twelfth Day of April, 2016

Michelle K. Lee  
*Director of the United States Patent and Trademark Office*